(12) United States Patent
Gilmore

(10) Patent No.: US 11,787,319 B2
(45) Date of Patent: Oct. 17, 2023

(54) APPARATUS FOR A SEAT, MORE PARTICULARLY A VEHICLE SEAT, FOR MOBILIZING AT LEAST ONE REGION OF A SPINAL COLUMN OF A SEAT OCCUPANT, METHOD FOR SEQUENTIALLY DRIVING AN APPARATUS AND SEAT, MORE PARTICULARLY VEHICLE SEAT

(71) Applicant: ADIENT US LLC, Plymouth, MI (US)

(72) Inventor: Bernard Gilmore, Burscheid (DE)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/637,932

(22) PCT Filed: Aug. 25, 2020

(86) PCT No.: PCT/EP2020/073753
§ 371 (c)(1),
(2) Date: Feb. 24, 2022

(87) PCT Pub. No.: WO2021/043638
PCT Pub. Date: Mar. 11, 2021

(65) Prior Publication Data
US 2022/0281369 A1 Sep. 8, 2022

(30) Foreign Application Priority Data
Sep. 2, 2019 (DE) .................... 10 2019 213 225.1

(51) Int. Cl.
*B60N 2/66* (2006.01)
*B60N 2/58* (2006.01)
(52) U.S. Cl.
CPC ........... *B60N 2/665* (2015.04); *B60N 2/5816* (2013.01); *B60N 2/663* (2015.04)

(58) Field of Classification Search
CPC ...... B60N 2/665; B60N 2/5616; B60N 2/976; B60N 2/5816
USPC ...................................... 297/284.6
See application file for complete search history.

(56) References Cited

U.S. PATENT DOCUMENTS

| 4,078,842 A * | 3/1978 | Zur ........................ A47C 7/021 |
| | | 297/284.6 |
| 2009/0099490 A1 | 4/2009 | Durt et al. |
| 2010/0244504 A1* | 9/2010 | Colja ................... A61H 9/0078 |
| | | 297/284.6 |

(Continued)

FOREIGN PATENT DOCUMENTS

| DE | 4431586 A1 | 3/1996 |
| DE | 10242760 B4 | 10/2007 |

(Continued)

OTHER PUBLICATIONS

PCT International Search Report and Written Opinion (PCT/EP2020/073753).

*Primary Examiner* — Milton Nelson, Jr.
(74) *Attorney, Agent, or Firm* — Marshall & Melhorn, LLC

(57) ABSTRACT

An apparatus for a vehicle seat for mobilizing at least one region of a spinal column of a seat occupant sitting in the seat may have a plurality of expandable elements, which may be each filled or fillable with a medium. The expandable elements are drivable sequentially. A method for sequentially driving the apparatus and and a vehicle seat are also provided.

5 Claims, 4 Drawing Sheets

(56) References Cited

U.S. PATENT DOCUMENTS

| | | | |
|---|---|---|---|
| 2016/0213553 A1 | 7/2016 | Oberg et al. | |
| 2016/0229320 A1 | 8/2016 | Lem et al. | |
| 2016/0296413 A1* | 10/2016 | Norman | B60N 2/976 |
| 2018/0125744 A1 | 5/2018 | Weber et al. | |
| 2018/0156629 A1* | 6/2018 | Lem | G01C 21/3652 |
| 2019/0038229 A1 | 2/2019 | Perraut et al. | |
| 2019/0160992 A1* | 5/2019 | Ishida | A61H 23/00 |

FOREIGN PATENT DOCUMENTS

| | | |
|---|---|---|
| DE | 102015221943 A1 | 5/2016 |
| DE | 102016212586 A1 | 1/2018 |
| DE | 102018205443 B3 | 7/2019 |
| EP | 3124320 B1 | 6/2019 |
| GB | 2222366 A | 3/1990 |
| WO | 2016202690 A1 | 12/2016 |

\* cited by examiner

APPARATUS FOR A SEAT, MORE PARTICULARLY A VEHICLE SEAT, FOR MOBILIZING AT LEAST ONE REGION OF A SPINAL COLUMN OF A SEAT OCCUPANT, METHOD FOR SEQUENTIALLY DRIVING AN APPARATUS AND SEAT, MORE PARTICULARLY VEHICLE SEAT

FIELD

The invention relates to an apparatus for a seat, in particular a vehicle seat, for mobilizing at least one region of a spinal column of a seat occupant sitting in the seat, wherein the apparatus has a plurality of expandable elements which are in each case filled, or able to be filled, with a medium.

BACKGROUND

Prolonged sitting can have a negative effect on the health of a human being. This is a result of the pelvis of the human being tilted toward the rear when sitting, and the spinal column, in particular the lumbar portion, is adversely stressed. Moreover, the intervertebral disks between the vertebral bodies are compressed when sitting. This leads to a loss of liquid of the intervertebral disks.

Apparatuses for mobilizing at least one region of a spinal column of a seat occupant are known from the prior art. For example, a vehicle seat having a seat cushion and a backrest as well as a massage system is known from WO 2016/202690 A1. The massage system has a plurality of elements impingeable with pressure, as well as a controller for actuating the elements impingeable with pressure in a targeted manner so as to obtain a massaging effect. The elements impingeable with pressure are in each case able to be separately pressurized by connecting lines.

SUMMARY

The invention is based on the object of providing an apparatus for mobilizing at least one region of a spinal column of a seat occupant, as well as a corresponding vehicle seat, which are improved in comparison to the prior art.

The object is achieved according to the invention by an apparatus for a seat, in particular a vehicle seat, for mobilizing at least one region of a spinal column of a seat occupant sitting in the seat, wherein the apparatus has a plurality of expandable elements which are in each case filled, or able to be filled, with a medium, wherein the expandable elements are sequentially actuatable.

As a result of the expandable elements being sequentially actuatable, individual regions of the seat can be continually and successively moved by the expandable elements, as a result of which an effect which is beneficial to health arises for the spinal column of the seat occupant.

The apparatus can have a number n of expandable elements, wherein the number n is preferably an even number. The number n is preferably eight. Two of the expandable elements can in each case be disposed next to one another in one row. A plurality of rows of in each case two expandable elements are preferably disposed below one another. The term next to one another means so as to be adjacent to in a transverse direction that runs parallel to a transverse axis and in a seat installed in a vehicle runs horizontally. The term below one another relates to a longitudinal axis of the backrest that runs substantially vertically from the bottom to the top and runs so as to be substantially parallel to the spinal column of the seat occupant. The longitudinal axis, when viewed in the transverse direction here, runs centrically through the seat. Of two expandable elements that are disposed in one row, one of the expandable elements is preferably disposed in a first seat half, and the other of the expandable elements is disposed in the second seat half.

The expandable elements can in each case be filled, or able to be filled, with a medium. The medium is a viscoelastic gel, for example. Alternatively, the media may also be air. The apparatus can furthermore have a support element, for example a support plate, on which the expandable elements are disposed. The support element is in particular a seat cover. Alternatively, the support element can also be a separate support plate which is fastened to the seat cover. The apparatus can be configured as a seat cover which comprises the expandable elements and optionally the support plate. The expandable elements are in particular disposed on a side of the seat cover that faces away from the seat occupant. The seat cover is able to be releasably connected to a seat, for example. The expandable elements are preferably disposed in a region of the seat cover that covers a central region of the backrest of the seat.

The expandable elements can be connected to a control unit. The expandable elements can be collectively or individually actuatable. The actuation can take place pneumatically, hydrostatically or mechanically. For example, an actuation of the expandable elements causes the medium to be pressurized, as a result of which the expandable elements carry out a movement relative to the seat occupant. The movement can be an expansion and/or a rotation. In the case of a mechanical drive it is also possible that the expandable elements individually or collectively carry out a longitudinal movement in the direction of the longitudinal axis of the backrest. The movements of the expandable elements here can be carried out in an alternating manner, simultaneously or so as to follow a specific motion pattern.

Furthermore, the expandable elements can be able to be brought to operatively engage with further elements, the latter being disposed in a foam cushion or a spring panel of the backrest and/or in an item of clothing of the seat occupant, for example. These further elements here are shaped in such a manner that the latter enable a movement of the expandable elements relative to the seat occupant.

The advantages that are achieved by the invention are in particular that a spinal column, or at least a spinal column region, of a seat occupant is mobilized by the expandable elements. Individual or a plurality of intervertebral bodies and/or muscles of the seat occupant can be mobilized in that forces are transmitted to the intervertebral bodies and/or the muscles by way of the movements of the expandable elements. Said intervertebral bodies and/or muscles at least partially follow the movements of the expandable elements, as a result of which the intervertebral disks of the spinal column are in particular relieved. The movements here are preferably carried out as micro-movements such that the seat occupant does not perceive, or at least barely perceives, said micro-movements. Damage to or deflection of the seat occupant as a result of the apparatus is thus avoided. Furthermore, a mobility of the seat occupant is improved during autonomous driving, in particular when the seat occupant during autonomous travel assumes a reclined position or almost a reclined position, which promotes an immobility of the spinal column of the seat occupant.

In one preferred embodiment, the seat cover is able to be releasably connected to the seat. As a result, said seat cover can be used independently of the seat. This enables a plurality of potential uses of the apparatus.

The invention is moreover achieved by a method for sequentially actuating an apparatus described above and hereunder. In a first method step a first expandable element is filled with a medium. Subsequently, in a second method step, a second expandable element is filled with a medium, and the medium is emptied from the first expandable element.

In a third method step a third expandable element can preferably be filled, and the medium can preferably be emptied from the second expandable element.

The apparatus can have a number n of expandable elements, wherein in a n-th method step a n-th expandable element is filled, and the medium is emptied from the (n−1)-th expandable element.

After filling the n-th expandable element, the n−1-th expandable element is preferably filled, and the medium (M) is emptied from the n-th expandable element. This sequential procedure can continue until the first expandable element is filled again.

The object is moreover achieved by a seat having an apparatus as described above and hereunder, in particular sequentially actuated by a method described above and hereunder.

BRIEF DESCRIPTION OF THE FIGURES

The invention is explained in more detail hereunder with the aid of advantageous exemplary embodiments illustrated in the figures. The invention is however not limited to these exemplary embodiments. In the figures.

Equivalent parts of the exemplary embodiments are provided with the same reference signs in all figures.

DETAILED DESCRIPTION

Figure 1:
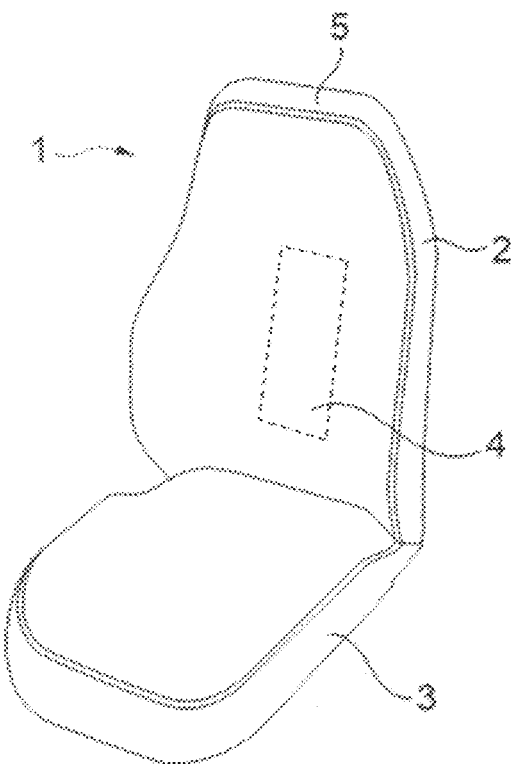
FIG. 1: schematically shows a perspective front view of a seat having an apparatus for mobilizing a spinal column of the seat occupant, according to a first exemplary embodiment.
Figure 2:
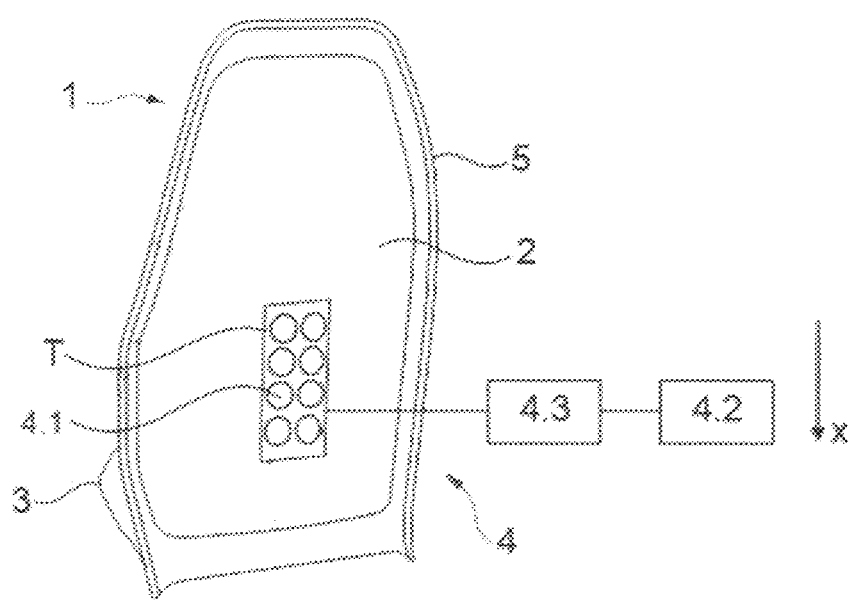
FIG. 2: schematically shows a perspective rear view of the seat from FIG. 1.

FIGS. 1 and 2 schematically show prospective views of a seat 1, for example of a vehicle seat. FIG. 1 here shows a front view, and FIG. 2 shows a rear view of the seat 1. The seat 1 comprises a backrest 2, a seat part 3 and an apparatus 4 for mobilizing a spinal column V of a seat occupant O, the latter being illustrated in an exemplary manner in FIG. 5.

The apparatus 4 is disposed in the region of the backrest 2 and comprises a plurality of expandable elements 4.1. The expandable elements 4.1 are disposed in or on a seat cover 5 of the seat 1 and fastened to said seat cover 5. The apparatus 4 is thus configured as a seat cover 5 or comprises the latter. In particular, the expandable elements 4.1 are disposed on a side of the seat cover 5 that faces away from the seat occupant O. This may be a rear side of the seat cover 4, or an internal side of a double-sided seat cover 5. For example, the seat cover 5 is connected to a cushion and/or a frame of the seat 1 so as to be a releasable in a non-destructive manner.

According to the first exemplary embodiment illustrated in FIG. 2, the expandable elements 4.1 are disposed in a region of the seat cover 5 that covers a central lower region of the backrest 2. The expandable elements 4.1 here are disposed in pairs below one another in the direction of a longitudinal axis x of the backrest 2. The longitudinal axis x runs so as to be largely vertical but is usually inclined toward the rear at an acute angle, the latter corresponding to a comfortable adjusted angle of the inclination of the backrest 2 in relation to the vertical.

The expandable elements 4.1 are in each case formed from an elastic material, for example silicone, that encloses a cavity. The cavity can be filled, or be able to be filled, with a medium M (see FIG. 4), for example air or a viscoelastic gel. The expandable elements 4.1 are in each case spherical, for example, but may also have any other arbitrary shape by way of which it is possible to mobilize the spinal column V of the seat occupant O. The expandable elements 4.1 are disposed on a common support plate T, for example, which is fastened to a side of the seat cover 5 and faces away from the seat occupant O. The support plate T can be connected to the seat cover 5 so as to be releasable in a non-destructive manner, or so as not to be releasable in a non-destructive manner.

The apparatus 4 for actuating the expandable elements 4.1 has a control unit 4.2 and a drive unit 4.3. The control unit 4.2 comprises electronics by which the drive unit 4.3 is actuatable. The drive unit 4.3 is configured pneumatically, hydrostatically or mechanically. For example, the drive unit 4.3 comprises a pump and a motor by which the medium M in the expandable elements 4.1 is able to be impinged with pressure p (see FIG. 4). The expandable elements 4.1 here can be connected to the drive unit 4.3 either by a common line L or in each case by a separate line L (see FIG. 4).

When actuating the drive unit 4.3, the medium M in the expandable elements 4.1 is impinged with pressure p, as a result of which the expandable elements 4.1 carry out a movement relative to the seat occupant O. The movements here can be carried out in an alternating manner, simultaneously or so as to follow a specific motion pattern. Furthermore, the movements can be an expansion and/order rotation. In the case of a mechanical drive it is also possible that the expandable elements 4.1 individually or conjointly carry out a longitudinal movement in the direction of the longitudinal axis x of the backrest 2.

The movements of the expandable elements 4.1 are carried out as micro-movements such that the seat occupant O does not, or barely, perceives said movements. As a result of the movements of the expandable elements 4.1, forces are transmitted to the intervertebral bodies and/or muscles of the seat occupant O. Said intervertebral bodies and/or muscles at least partially follow the movements of the expandable elements 4.1, as a result of which the intervertebral bodies and/or muscles are mobilized and the intervertebral disks of the spinal column V are in particular relieved. In other words, the expandable elements 4.1 are actively moved, this resulting in an active movement of the intervertebral bodies and/or muscles of the seat occupant O.

Furthermore, the expandable elements 4.1 can be able to be brought to operatively engage with further elements (not shown), the latter being disposed in a foam cushion or in a spring panel of the backrest 2 and/or in an item of clothing of the seat occupant O, for example. These further elements here are shaped in such a manner that said further elements support a movement of the expandable elements 4.1 relative to the seat occupant O.

Figure 3:
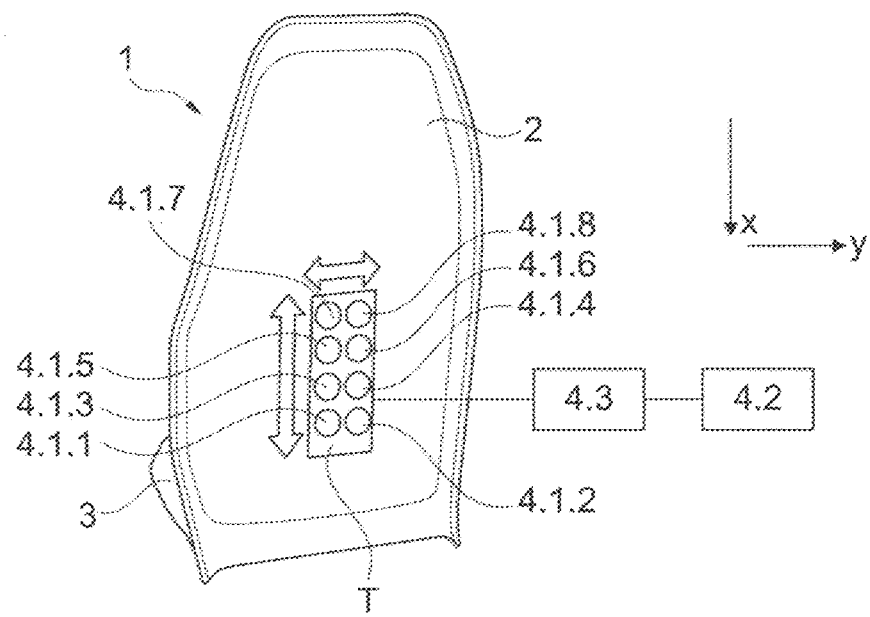
FIG. 3: schematically shows a further perspective rear view of a seat, having an apparatus for mobilizing a spinal column of the seat occupant, according to a second exemplary embodiment.

FIG. 3 schematically shows a perspective rear view of the seat 1, having the apparatus 4 of a second exemplary embodiment. The second exemplary embodiment in terms of construction and function corresponds to the first exemplary embodiment described above, unless described differently herebelow.

The apparatus 4 here comprises eight expandable elements 4.1.1 to 4.1.8 which are disposed in pairs below one another in the direction of the longitudinal axis x. The expandable elements 4.1.1 to 4.1.8 in the second exemplary embodiment are sequentially actuated. A sequential actuation of expandable elements 4.1.1 to 4.1.8, which lie mutually opposite in a transverse axis y, is performed in particular by expansion and compression.

A method for sequentially actuating the apparatus 4 provides, for example, that a first expandable element 4.1.1 is filled with the medium M and inflated with the latter. A second expandable element 4.1.2 which in the direction of the transverse axis y lies opposite the first expandable element 4.1.1 is subsequently inflated. The medium M is simultaneously released from the first expandable element 4.1.1, the latter thus being emptied. A third expandable element 4.1.3 is subsequently inflated, and the second expandable element 4.1.2 is simultaneously emptied. In a first mobilizing sequence, this continues up to an eighth expandable element 4.1.8. In a second mobilizing sequence, the inflating and emptying according to the manner described above takes place in the reverse order, from the eighth expandable element 4.1.8 to the first expandable element 4.1.1. In other words, an undulating impingement of the spinal column V of the seat occupant O takes place.

Figure 7:
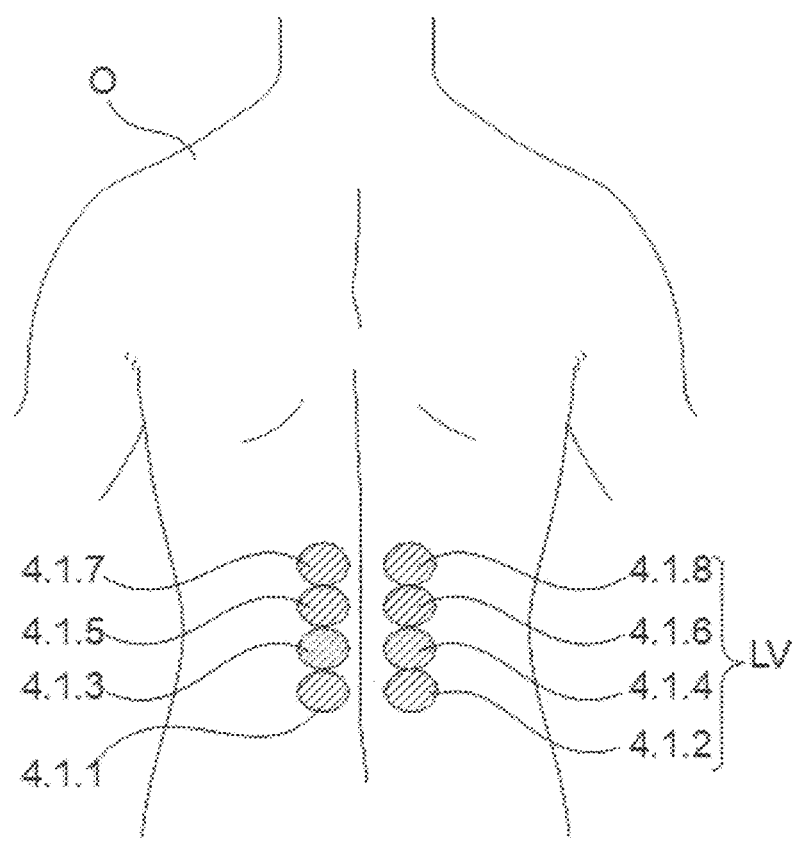
FIG. 7: schematically shows a rear view of a seat occupant.

The sequential actuation of the expandable elements 4.1.1 to 4.1.8 described causes a rotating movement of the vertebrae of the spinal column regions shown in FIG. 7, in particular a lumbar region LV between a region between a first lumbar vertebra and a fourth lumbar vertebra, and a lower, in particular twelfth, thoracic vertebra.

Figure 4:
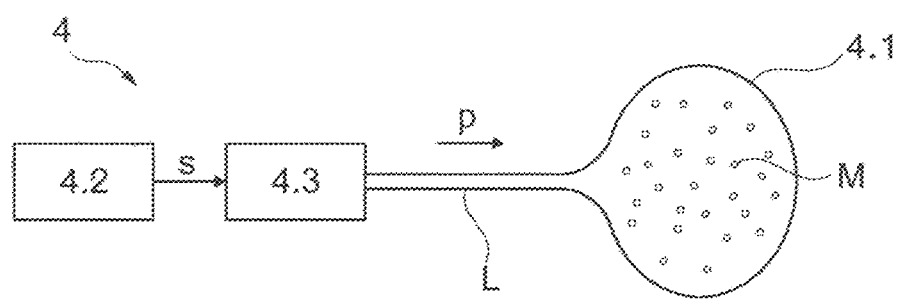
FIG. 4: schematically shows an apparatus for mobilizing a spinal column of the seat occupant.

FIG. 4 schematically shows the apparatus 4 having an expandable element 4.1 which is filled with the medium M. Furthermore shown are the control unit 4.2 and the drive unit 4.3. Such an arrangement is also possible for each one of the expandable elements 4.1.1 to 4.1.8.

The control unit 4.2 for actuating the drive unit 4.3 transmits a control signal s to the drive unit 4.3. This can take place automatically or manually. For example, the seat occupant O can activate the apparatus 4 manually by an operating unit (not shown). To this end, a button or a switch is disposed closest to the seat 1, for example. Alternatively, the apparatus 4 can also be automatically activated. For example, the apparatus 4 is activated as soon as the seat occupant O is seated on the seat 1. To this end, specific sensors, for example capacitive sensors, are disposed in the seat part 3 of the seat 1. It can furthermore be provided that the apparatus 4 is automatically activated after a predefined operating time of the seat 1, for example when driving.

In the apparatus 4 shown, the expandable elements 4.1 can be disposed on the seat cover 5, and the control unit 4.2 and the drive unit 4.3 can be disposed outside the seat cover 5. The control unit 4.2 and the drive unit 4.3 here can be disposed either within the seat 1, for example in a seat frame, or outside the seat 1, for example in a vehicle interior. It is also possible for the entire apparatus 4, the latter comprising the expandable elements 4.1, the control unit 4.2 and the drive unit 4.3, to be disposed on and fastened to the seat cover 5. The control unit 4.2 and/or the drive unit 4.3 here are provided with an electronic interface for connecting to a power source.

Figure 5:
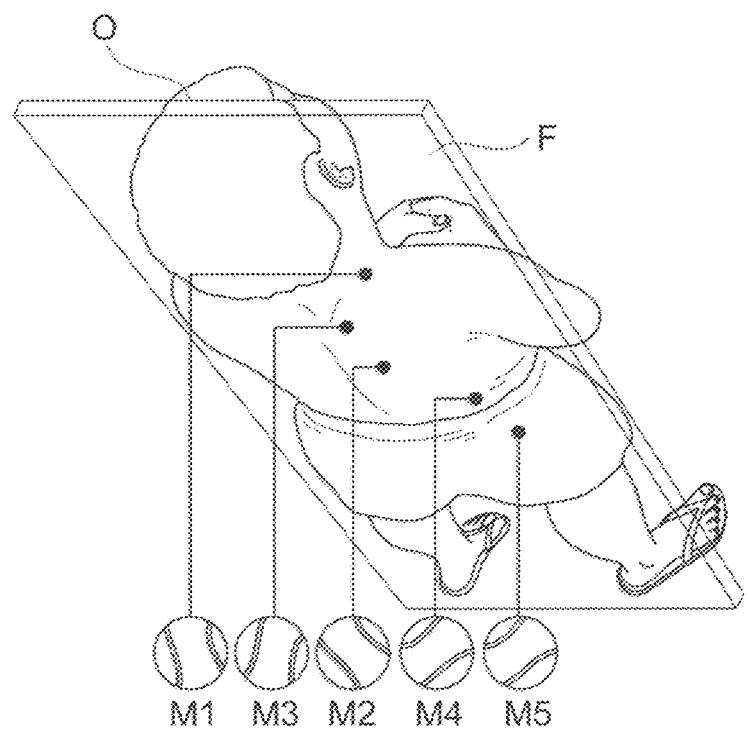
FIG. 5: schematically shows a perspective rear view of a seat occupant.

FIG. 5 shows a perspective rear view of a seat occupant O that is situated in a reclining position on a face F. It is shown by way of which muscles the seat occupant O bears on the face F such that these muscles are suitable for mobilizing by the previously described apparatuses 4. The seat occupant O bears on the face F in particular in the region of an upper trapezius M1, a lower trapezius M3, a skeletal muscle M2, in particular the musculus rhomboideus major, a spinal muscle M4, and a buttock M5.

Figure 6:
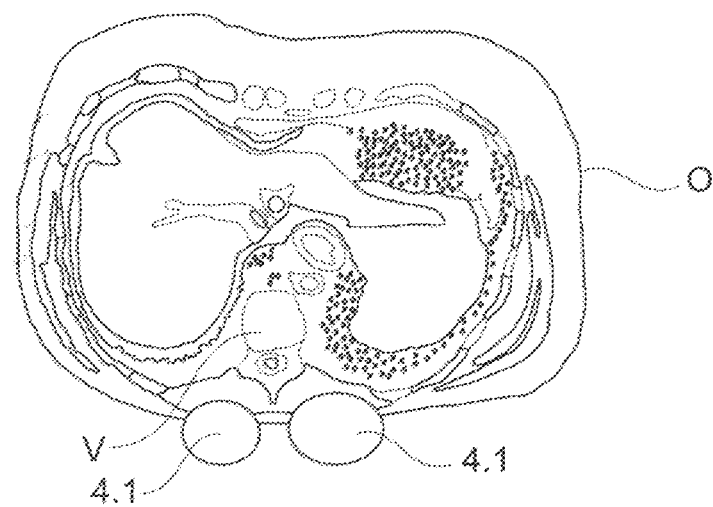
FIG. 6: shows a sectional MRT image in a transversal plane of a thorax of a seat occupant and the apparatus for mobilizing a spinal column of the seat occupant.

FIG. 6 shows a sectional MRT image in a transversal plane of a thorax of a seat occupant O and the apparatus 4 for mobilizing the spinal column V of the seat occupant O. Of the apparatus 4, two expandable elements 4.1 disposed next to one another (for example the expandable elements 4.1.1 and 4.1.2 of the second exemplary embodiment) are shown here, said expandable elements 4.1 when activated causing mobilizing of the spinal muscles M4 and thus mobilizing of the intervertebral bodies of the spinal column V and relieving the intervertebral disks.

FIG. 7 schematically shows a rear view of a seat occupant O and the apparatus 4 for mobilizing the spinal column V of the seat occupant O. Of the apparatus 4, eight expandable elements 4.1.1 to 4.1.8 according to the second exemplary embodiment illustrated in FIG. 2 are shown here. Said elements 4.1.1 to 4.1.8 cause mobilizing of the spinal column V in the lumbar region LV between a region between a first lumbar vertebra and a fourth lumbar vertebra, and a lower, in particular twelfth, thoracic vertebra.

The features disclosed in the above description, the claims and the figures may be of significance both individually and in combination for implementing the invention in its various refinements, to the extent that said features remain in the scope of protection of the claims.

Terms such as "comprise", "have", "include", "contain" and the like used in the claims do not exclude further elements or steps. The use of the indefinite article does not exclude a plurality. An individual device can carry out the functions of a plurality of units or devices mentioned in the claims.

LIST OF REFERENCE SIGNS

1 Seat
2 Backrest
3 Seat part
4 Apparatus
4.1 Expandable element
4.1.1 Expandable element
4.1.2 Expandable element
4.1.3 Expandable element
4.1.4 Expandable element
4.1.5 Expandable element
4.1.6 Expandable element
4.1.7 Expandable element
4.1.8 Expandable element
4.2 Control unit
4.3 Drive unit
5 Seat cover
F Face
L Line
LV Lumbar region M Medium
M1 Upper trapezius
M2 Skeletal muscle
M3 Lower trapezius
M4 Spinal muscle
M5 Buttock
O Seat occupant
T Support plate
V Spinal column
p Pressure
s Control signal
x Longitudinal axis
y Transverse axis

What is claimed:

1. A method for sequentially actuating an apparatus for a vehicle seat for mobilizing at least one region of a spinal column of a seat occupant sitting in the seat, comprising:
   providing the apparatus with a plurality of expandable elements which are in each case filled, or able to be filled, with a medium, wherein the expandable elements are sequentially actuatable, wherein at least one of the expandable elements is rotatable about the direction of the longitudinal axis of a backrest of the vehicle seat, wherein in a first method step a first expandable element is filled with the medium, and subsequently, in a second method step, a second expandable element is filled with the medium, and the medium is emptied from the first expandable element.

2. The method as claimed in claim 1, wherein in a third method step a third expandable element is filled, and the medium is emptied from the second expandable element.

3. The method as claimed in claim 1, wherein the apparatus has a number of expandable elements, and in a n-th method step a n-th expandable element is filled, and the medium is emptied from an n−1-th expandable element.

4. The method as claimed in claim 3, whereinafter the filling of the n-th expandable element, the n−1-th expandable element is filled, and the medium is emptied from the n−1-th expandable element, and this sequence is subsequently continued until the first expandable element is filled again.

5. A vehicle seat having the apparatus wherein the apparatus is sequentially actuated by a method as claimed in claim 1.

* * * * *